United States Patent [19]
Ohle

[11] 3,802,158
[45] Apr. 9, 1974

[54] POLLUTION CONTROL APPARATUS

[76] Inventor: Harold F. Ohle, 11949 Sesser St., Norwalk, Calif. 90650

[22] Filed: June 22, 1973

[21] Appl. No.: 372,852

[52] U.S. Cl............. 55/122, 55/126, 55/129, 55/226, 55/228, 55/229, 55/259, 55/320, 55/387, 55/440, 55/519, 55/527, 55/DIG. 36, 98/115 K

[51] Int. Cl.............................................. B03c 3/01

[58] Field of Search........ 55/440; 55/122, 124, 126, 55/128, 129, 220, 226, 228, 229, 259, 257, 315, 442, 443, 320, 512, 516, 518, 519, 527, 387, DIG. 36, DIG. 29, DIG. 18; 98/115 R, 115 K; 126/299

[56] References Cited
UNITED STATES PATENTS

| | | | |
|---|---|---|---|
| 3,248,858 | 5/1966 | Toke | 55/DIG. 36 |
| 3,260,189 | 7/1966 | Jensen | 126/299 X |
| 3,315,445 | 4/1967 | DeSeversky | 55/122 |
| 3,494,099 | 2/1970 | Eng et al. | 55/8 |
| 3,618,659 | 11/1971 | Rawal | 165/107 |
| 3,744,217 | 7/1973 | Ebert | 98/115 K X |
| 3,747,301 | 7/1973 | Glover et al. | 55/481 X |

FOREIGN PATENTS OR APPLICATIONS

| | | | |
|---|---|---|---|
| 574,079 | 4/1933 | Germany | 55/122 |
| 45-21876 | 7/1970 | Japan | 55/126 |

OTHER PUBLICATIONS

German Printed Application No. 1,085,854, printed 7-28-60, (2 pages specification, 1 sheet of drawing).

*Primary Examiner*—Dennis E. Talbert, Jr.
*Attorney, Agent, or Firm*—Fulwider Patton Rieber Lee & Utecht

[57] ABSTRACT

Pollution control apparatus for eliminating grease, smoke and other pollutants from the air discharged by restaurants and the like as a result of good preparation. Water spray nozzles wash grease and large particles from the restaurant exhaust, and the separated material falls into a collection tank having a skim dam at one end and spray nozzles at the other end. The water spray skims the grease off the water so that the water can be circulated. Baffles disposed across the path of the washed air remove most of the water, and a downstream filter system removes most of the remaining moisture. The generally non-turbulent air leaving the filter system is slowed in a stall chamber, and electrostatic precipitators next act on the air as it leaves the stall chamber to remove smaller particle pollutants not removed by the water wash section.

7 Claims, 5 Drawing Figures

POLLUTION CONTROL APPARATUS

BACKGROUND OF THE INVENTION

1. Field of the Invention

The present invention relates to pollution control apparatus and more particularly to pollution control apparatus utilizing both water wash and electrostatic precipitator sections.

2. Description of the Prior Art

Although the present pollution control apparatus is useful in a variety of applications, it is primarily intended for use in eliminating grease, smoke and other pollutants from the exhaust coming from a restaurant or the like as a result of cooking and broiling operations. Such operations are often accompanied by the discharge of clouds of smoke and grease laden air. The grease tends to clog up removal equipment and poses both a fire hazard and a maintenance problem.

Devices utilizing water spray nozzles are fairly effective to separate the grease from the air but difficulty has been encountered in efficiently collecting and removing the grease from the water so that the water can be recirculated. Moreover, water spray systems are not particularly effective in separating smoke and similar small particles.

This is better accomplished by electrostatic precipitators which electrically charge the particles and cause them to collect upon oppositely charged plates of the precipitator. However, a combination of an electrostatic precipitator with a water wash system presents a problem in that the moisture must be substantially completely removed from the air before it enters the precipitator or the precipitator will not operate efficiently. Moreover, this must be done without unduly blocking the air flow or a very large exhaust fan would be required.

SUMMARY OF THE INVENTION

According to the present invention, a pollution control apparatus is provided which includes a water wash system to direct a curtain of water across the polluted air and thereby remove large grease particles and the like. These particles fall with the water into a collection tank having a skim dam at one end and a bank of spray nozzles at the other end. The nozzles effect separation of the grease by passage over the skim dam.

The apparatus further includes baffles encountered by the washed air to intercept larger water droplets. The baffles are inclined across the air flow path to intercept most of the water particles, but the baffles are spaced apart to provide minimum impedance to the air. Consequently, the air is not substantially slowed on passing through the baffles.

A filter system downstream of the baffles provides a multiplicity of small air passages which further separate moisture from the air and convert the air flow from a turbulent to a substantially non-turbulent state.

The present control apparatus includes a stall chamber of enlarged capacity beyond the filter to slow the air for entry into an electrostatic precipitator at a controlled rate.

The foregoing particular combination of water wash and electrostatic precipitator systems effects efficient removal of both grease and smoke. The moisture passing to the precipitator is reduced to an acceptable level, the air flow rate to the precipitator is controlled without loading the exhaust fan, and the separated grease is constantly removed to prevent equipment clogging and permit continuous water recirculation.

Other objects and features of the invention will become apparent from consideration of the following description taken in connection with the accompanying drawings.

DESCRIPTION OF THE PREFERRED EMBODIMENT

Figure 1:
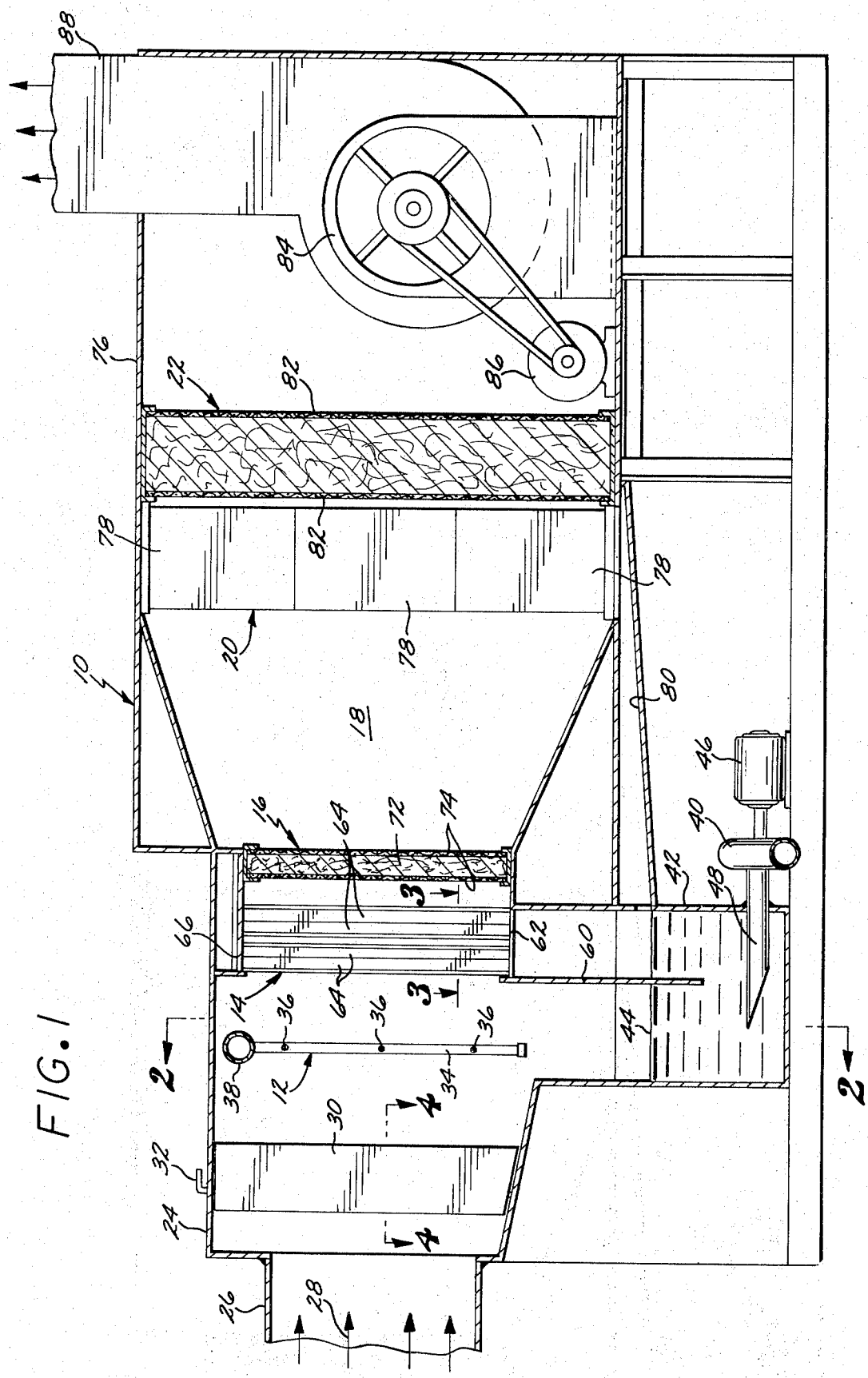
FIG. 1 is a longitudinal cross-sectional view of pollution control apparatus according to the present invention.
Figure 2:
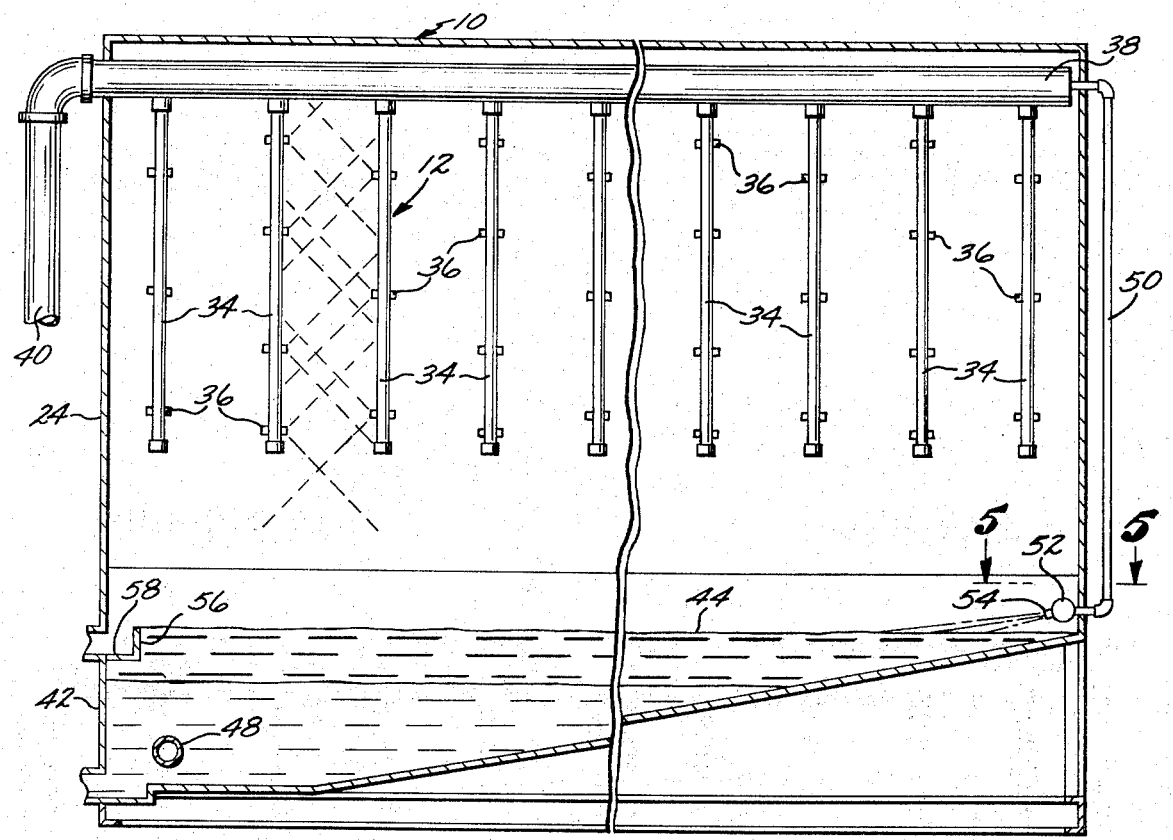
FIG. 2 is a view taken along the line 2—2 of FIG. 1.

Referring now to the drawings, and particularly to FIGS. 1 and 2, there is illustrated a pollution control apparatus 10 which comprises, generally, a water-wash assembly 12 operative to remove grease and larger particle pollutants; a water eliminator assembly 14 located downstream of the wash assembly 12; a filter assembly 16 receiving air exhausted from the eliminator assembly 14; an air velocity control or stall chamber 18 downstream of the filter assembly 16; and an electrostatic precipator assembly 20 operative to remove smaller pollutant particles prior to discharge of the cleaned air through a final filter assembly 22.

Although the pollution control apparatus 10 can be used to remove pollutants from air exhausted from various kinds of commercial or industrial operations, it is particularly adapted for treatment of the grease laden, smokey air exhausted from a restaurant as a result of broiling of meats and the like.

The apparatus 10 includes an elongated housing which is rectangular in transverse cross-section and constituted of water wash section 24 in communication with an exhaust stack or duct 26 leading to the broiling area of a restaurant or the like. In usual broiling operations large quantities of grease laden, smokey air are discharged through the duct 26 along the path of the arrows 28.

Figure 4:
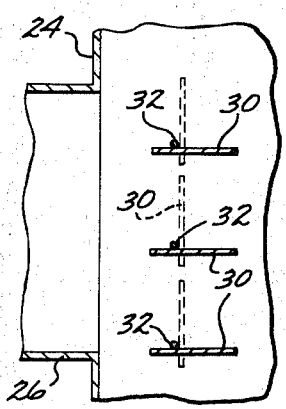
FIG. 4 is a view taken along the line 4—4 of FIG. 1.

As best seen in FIGS. 1 and 4, the entering polluted air passes between a plurality of transversely arranged, vertically extending baffles 30 located in the wash section 24 and disposed across the discharge end of the duct 26. The baffles 30 are mounted to vertically extending rods 32 which are pivotally mounted to the apparatus housing. The rods are suitably ganged together so that an integral handle on one of the rods 32 is operative to turn the baffles between the open positions shown in full line in FIG. 4, and the closed positions shown in dotted outline. The position of the baffles 30 provides for some adjustment of the air velocity through the apparatus 10.

A plurality of vertically extending pipes 34 form a part of the water wash assembly 12 and are located downstream of the baffles 30. Each pipe 34 includes a plurality of oppositely extending vertically spaced apart spray nozzles 36 which operate to present a water spray curtain to the air as it leaves the baffles 30. The pipes 34 are closed at their lower ends but communicate at their upper ends with a horizontally extending header pipe 38 connected to a water supply line 40, as best seen in FIG. 2.

The water spray curtain is operative to remove grease and large pollutant particles from the dirty air leaving the baffles 30. These particles and accompanying water fall into a collection tank 42, which constitutes a downwardly extending continuation of the water wash section 24.

The water in the tank 42 is normally maintained at a level 44, as seen in FIGS. 1 and 2, by a water circulation pump 46 which continuously draws water from the tank 42 through a suction line 48 and discharges it through the water supply line 40.

Figure 5:
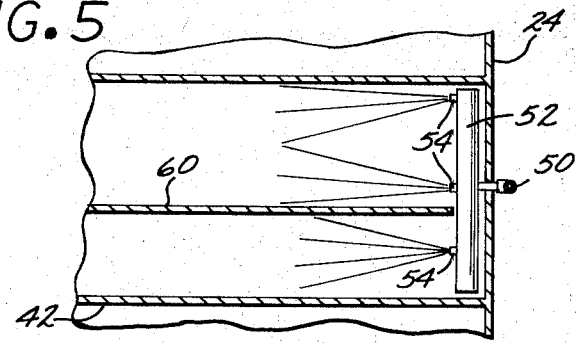
FIG. 5 is a view taken along the line 5—5 of FIG. 2.

A branch water line 50 is connected at its upper end to the header pipe 38, and at its lower end mounts a horizontally extending tank nozzle header 52. The header 52 is located at the far end of the tank 42, as viewed in FIG. 1. As best seen in FIG. 5, the nozzle header 52 includes a pair of nozzles 54 which each direct a fine spray of water in a generally horizontal and downward direction to gently urge floating grease on the water surface 44 toward the near end of the tank 42, or to the left as seen in FIG. 2. A skim dam 56 is disposed across this end, and grease flows over the dam 56 and into a grease trough 58 for conveyance to a suitable collection container (not shown) for periodic removal.

A transversely extending, vertically oriented baffle 60 extends into the tank 42 below the water level 44, and is attached at its upper end to a horizontal shelf 62 which is secured to structure which forms a part of the water wash section 24. The baffle 60 has the effect of preventing spray water dropping down from the nozzles 36 from churning and turning over the water in the tank 42. Consequently, grease in the tank 42 has an opportunity to rise through the non-turbulent water to the surface for gentle conveyance to the skim dam 56 by the action of the pair of nozzles 54.

Figure 3:
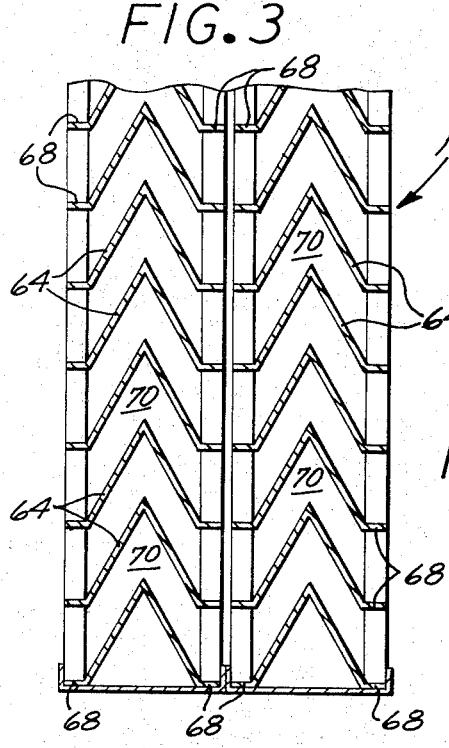
FIG. 3 is an enlarged view taken along the line 3—3 of FIG. 1.

The water eliminator assembly 14 located downstream from the wash assembly 12 comprises a pair of rows or banks of vertically extending baffles 64 attached at their lower ends to the horizontal shelf 62 and at their upper ends to a complemental horizontal upper shelf 66. As best seen in FIG. 3, each baffle 64 is generally V-shape in configuration, and the bases of the V are characterized by flanges 68 which are welded or otherwise secured at their upper and lower ends to the shelves 66 and 62, respectively. The space between each pair of adjacent baffles 64 provides a relatively unobstructed air passage 70 which does not significantly affect the velocity of the air stream. However, since the apex of the V of each baffle 64 extends across the straight line path for the air steam, larger water particles moving with the air stream impinge against the baffles 64 and are drained downwardly into the tank 42.

The shelves 62 and 66 also support the filter assembly 16 which comprises, generally, a glass wool or batting central section 72 covered on opposite sides with screening 74. The central section 72 and the screening 74 typically include relatively small interstices defining circuitous passages for the air stream. These passages allow air to pass through, at a reduced velocity, and retain most of any remaining moisture in the air as it leaves the baffles 64. The filter assembly 16 has the effect of also rendering the air stream substantially non-turbulent. The essentially laminar flow next passes to the stall chamber 18.

As best seen in FIG. 1, the water wash section 24 is connected to a larger downstream precipitator section 76 by means of the stall chamber 18. Although the sides of the wash section 24, section 76 and stall chamber 18 are generally in longitudinal alignment, the top and bottom of chamber 18 immediately downstream of the filter assembly 16 diverge in a rearward direction, with the precipitator assembly 20 being located at the largest downstream cross-section of the chamber 18. The gradually increasing size of the stall chamber 18 has the effect of slowing the velocity of the air leaving the assembly 16. By way of example, air moving through the section 24 at approximately 350-450 ft./min. is slowed by the chamber 18 for entry into the precipitator assembly 20 at approximately 300-350 ft./min. This latter velocity is productive of most efficient operation of the electrostatic precipitator 20, as will be apparent to those skilled in the art.

The assembly 20 is of conventional construction and consequently a description of the details of the structure are omitted for brevity. In general, the precipitator assembly 20 comprises a plurality of spaced apart plates 38 between which are disposed tungsten wires (not shown) which impart a positive charge to any small pollutant particles in the air stream passing between the plates 78. The plates 78 are electrically negative, and the positively charged solid pollutant particles collect on the plates, while liquid particles can flow down the plates and across the inclined bottom plate 80 to the tank 42. The solid particles are periodically removed from the plates 78 to permit repeated use of the plates.

The filter assembly 22 is suitably secured at its upper and lower ends to the upper end lower walls of the precipitator section 76, and extends across the complete width of the section 76. The assembly 22 is an optional item with the present apparatus but is preferably used when odor of the discharged air is a problem. In that event the assembly 22 comprises activated charcoal or potassium permanganate held in position by external layers of screen 82.

Air is pulled through the apparatus 10 by a centrifugal exhaust fan 84 located in the precipitator section 176 downstream of the filter assembly 22. The fan 84 is belt driven by a conventional electric motor 86, and the cleansed air is discharged by the fan upwardly and out of an exhaust stack 88.

Summarizing the operation of the pollution control apparatus 10, dirty air entering through the exhaust duct 26 is regulated in velocity by positioning the baffles 30. The air passes through the baffles 30 and into the water wash section 24 where the spray nozzles 36 cause heavy grease and larger dirt particles to drop into the collection tank 42 along with the spray water. The nozzles 54 continually cause floating grease on the surface of the water to move across the skim dam 56 and into the grease trough 58 for removal. Water in the tank 42 is drawn off through a suction line by the pump 46 for recirculation through the various nozzles.

Air passing from the nozzles 36 includes considerable water vapor droplets which impinge against the V-shape baffles 64. This water flows downwardly and collects in the tank 42. Most of the water in the air is removed in this fashion. However, further moisture is removed by the filter assembly 16, which also has the effect of converting the air stream to a relatively non-turbulent state as it enters the stall chamber 18.

The relatively water-free air slows on entry into the relatively large volume chamber 18, and the reduced velocity air then passes into the electrostatic precipitator assembly 20. The remaining smaller pollutant particles are precipitated out and collect upon the plates 38, or drain downwardly toward the tank 42. Air leaving the assembly 20 next passes through the filter assembly 22, and is finally discharged by the exhaust fan 84 to atmosphere through the exhaust stack 88.

Air discharged from the present pollution control apparatus is substantially free of grease, smoke, and other pollutants and can be released to the atmosphere without creating any pollution problem. The apparatus is characterized by continuous removal of grease, which greatly simplifies the problem of maintenance, and by conservation of water through continuous recirculation.

The eliminator assembly 14 is effective to remove substantially all of the water resulting from the water wash phase of the operation and, because the passages through the baffles do not block the free flow of air past the baffles, water separation is accomplished without unduly loading the exhaust fan. Consequently, the power requirements of the apparatus are minimal.

Various modifications and changes may be made with regard to the foregoing detailed description without departing from the spirit of the invention.

I claim:

1. Pollution control apparatus for separating pollutants from exhaust air, said apparatus comprising:

means defining an elongated housing having an inlet for receiving polluted exhaust air and an outlet for discharging clean air, said housing including a water wash section and a larger precipitator section downstream of said wash section, said housing further including a collection tank at its bottom characterized by a skim dam at one end and tank water spray nozzles at the opposite end;

water wash means including a plurality of water wash spray nozzles operative to provide a curtain of water spray adjacent said housing inlet above said collection tank to separate larger size pollutant particles from the exhaust air for collection in said collection tank;

water eliminator means above said tank and downsteam of said water wash means, including a plurality of spaced apart baffles providing paths for free flow of air therebetween, portions of said baffles extending across the straight line path of air through said water eliminator means to intercept large water particles for drainage into said tank;

means between said wash section and said precipitator section defining a stall chamber into which air enters from said eliminator means and slows prior to entering said precipitator section;

electrostatic precipitator means downstream of said stall chamber and operative to electrostatically remove small pollutant particles from air passing through said precipitator means; and an exhaust fan downstream of said precipitator means and operative to pull air through the apparatus for discharge to atmosphere.

2. Apparatus according to claim 1 and including a baffle extending into said tank between said wash spray nozzles and said water eliminators whereby water roiling is reduced and buoyant pollutants are allowed to float to the surface for skimming.

3. Apparatus according to claim 1 and including baffles upstream of said wash section and operative to adjust the rate of air flow through the apparatus.

4. Apparatus according to claim 1 and including an odor removal filter assembly located downstream of said precipitator assembly.

5. Apparatus according to claim 1 and including a spray pump coupled to said tank, said wash spray nozzles, and said tank spray nozzles and operative to recirculate water from said tank to said wash and tank spray nozzles.

6. Apparatus according to claim 1 and including a filter assembly downstream of said water eliminator baffles to capture residual moisture particles, said filter assembly including means defining a multiplicity of interstices for passage of air and operative to promote laminar air flow to said precipitator assembly.

7. Apparatus according to claim 6 wherein said means defining said interstices comprises glass wool.

* * * * *